April 3, 1934.   J. F. MURTAUGH   1,953,362
DRIVING TUMBLER
Filed Aug. 7, 1930
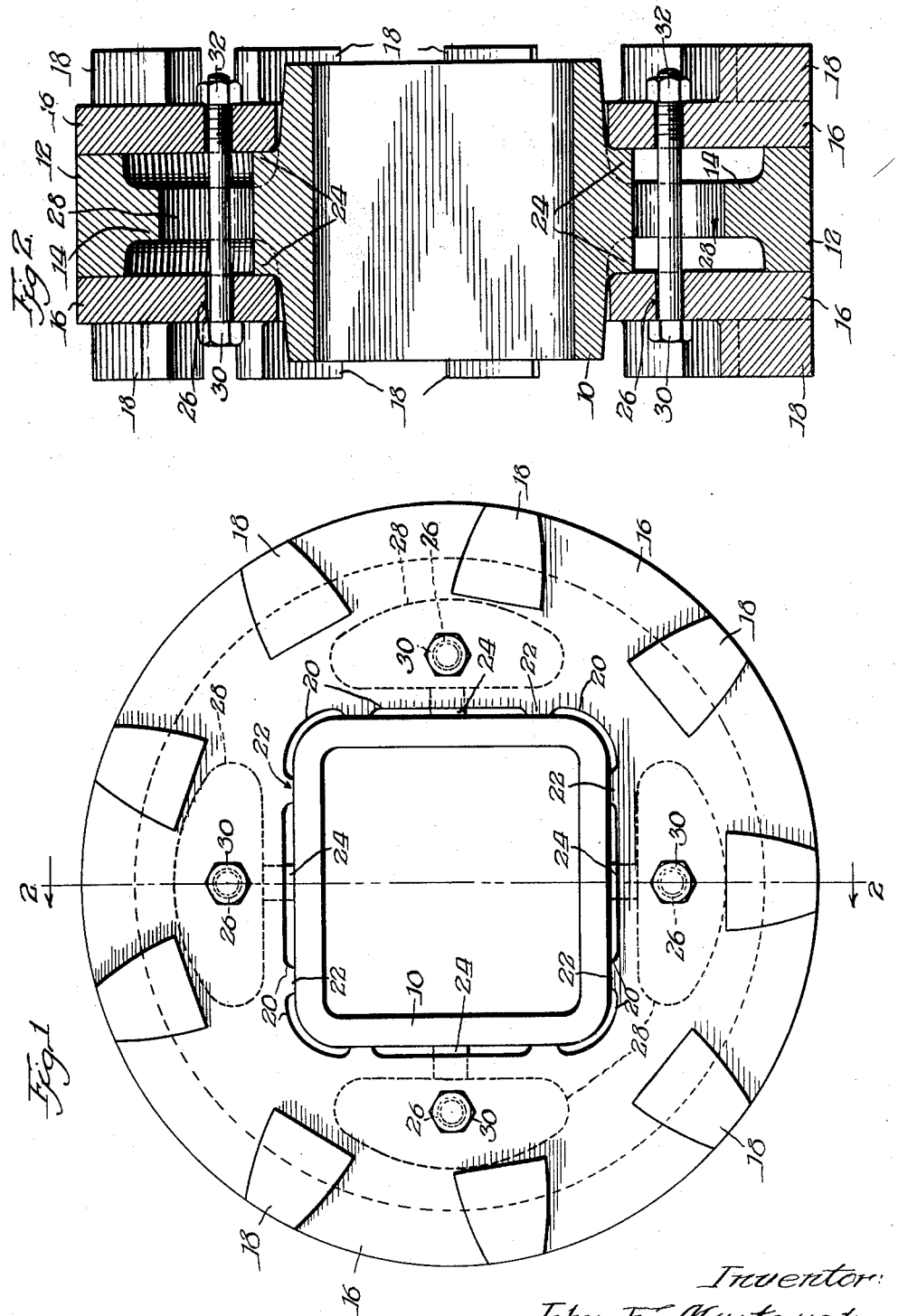
Inventor:
John F. Murtaugh
By Wilkinson, Huxley, Byron & Knight Attys
Witness
R. B. Davison Patented Apr. 3, 1934

1,953,362

UNITED STATES PATENT OFFICE 1,953,362

DRIVING TUMBLER

John F. Murtaugh, Denver, Colo., assignor to American Manganese Steel Company, Chicago, Ill., a corporation of Maine Application August 7, 1930, Serial No. 473,632

7 Claims. (Cl. 74—31)

This invention relates to driving tumblers and is illustrated as embodied in a tumbler which may be used, for example, in driving the endless chain of tractor shoes on a steam shovel or the like. The illustrated embodiment of the invention includes a one-piece member, including hub and rim, on each side of which is secured a replaceable lug bearing annular disk for engagement with the tractor shoes. Both the outside of the hub and the inside of the annular disks are made non-circular in order to relieve the retaining bolts of any driving strain.

One object of the invention is to provide a driving tumbler having replaceable lugs and provision for transmitting the driving force to the lugs dependably and without detriment to the removability of the lugs.

Another object of the invention is to provide a driving tumbler having thereon removable lug bearing disks to which the driving force is transmitted in a manner not to strain or injure the attaching means.

A further object of the invention is to provide a driving disk which not only fulfills the above objects but is economically manufactured and easily repaired.

With these and various other objects in view, the invention may consist of certain novel features of construction and operation, as will be more fully described and particularly pointed out in the specification, drawing and claims appended hereto.

In the drawing, which illustrates an embodiment of the device and wherein like reference characters are used to designate like parts—

Figure 1 is a side elevation of the illustrated embodiment of the tumbler, and

Figure 2 is a cross section taken through the line 2—2 of Figure 1.

The embodiment of the driving tumbler which has been chosen for illustration comprises three parts. One part includes the hub 10, the rim 12, and the connecting flange 14. The other two parts are the disks 16 which carry driving lugs 18 formed integrally therewith. The hub 10 is made in the form of a hollow square but of course any other suitable shape would do. The annular disks 16 are formed with their central holes generally square in contour, and shaped to fit snugly over the hub 10 in order that proper seating may be more easily secured. The disks are left hollowed out slightly as at 20 or in other words the walls of the openings are set back in part as at 20. This is done so that the areas of contact 22 which may some times need grinding down, are comparatively small. The rim 12 is of a thickness to properly space the disk 16. Extending from the hub 10 are seating pads 24, the faces of which are in the planes of the faces of the rim 12. The seating pads may extend all the way around the hub but in order to save weight are preferably found only where needed, such as the four positions shown. A suitable number of holes 26 are provided in each of the disks 16 and correspondingly placed greatly enlarged holes 28 are formed in the flange 14. By making these holes large the necessity of close fitting is avoided and considerable metal is saved. Bolts 30 are passed through the holes in the assembled parts and tightened in place with nuts 32 to complete a rigid and durable yet easily repaired driving tumbler.

From the foregoing description several advantages of the improved driving tumbler are quite clear. Foremost among these is the fact that although the lugs are formed on disks for ready replacement, and the disks are secured merely by nuts and bolts, yet due to the interfitting of the disks and the hub there is all the desired driving strength without any strain on the bolts. Another advantage is in the economy of manufacture for much of the excess metal has been omitted, leaving all the metal necessary for full strength and for seating of the disks both on the outside and the inside edges. Another advantage is that due to the fact that there are only small contact areas between the hub and the disks very exact fitting may be obtained by only a slight amount of grinding.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. A driving tumbler including a hub, a flange extending from said hub and having large openings therethrough, a rim around the outside of said flange, seating pads extending from said hub, driving disks seated against said seating pads and against said rim and securing means extending through holes in said disks and through said large openings in said flange.

2. A driving tumbler including a non-circular hub the walls of which are reasonably thin, a flange extending from said hub, a rim on said flange spaced from said hub and having smooth side faces, seating pads on said hub spaced from said rim having flat side faces, and driving disks having flat inside faces and having formed in their central portions openings for the non-rotative reception of said hub and having lugs formed externally thereon, said driving disks being mounted to rest against said rim and said seating pads.

3. A driving tumbler including a non-circular hub the walls of which are reasonably thin, a flange extending from said hub, a rim on said flange spaced from said hub and having smooth side faces, seating pads on said hub spaced from said rim and having flat side faces, and driving disks having flat inside faces and having formed in their central portions openings for the non-rotative reception of said hub and having lugs formed externally thereon, said driving disks being mounted to rest against said rim and said seating pads, the central openings of said driving disks being cut away to leave a minimum of bearing surface contacting with the part of said hub within said opening.

4. A driving tumbler including a non-circular hub, a flange extending from said hub having large openings therethrough, a driving disk having a central opening corresponding in shape with said hub, and means extending loosely through the openings in said flange for securing said disk against said flange and on said hub in position to be in rigid driving relation with said hub.

5. A driving tumbler including a non-circular hub, a flange extending from said hub having large openings therethrough, a driving disk having a central opening corresponding in shape with said hub, means extending loosely through the openings in said flange for securing said disk against said flange and on said hub in position to be in rigid driving relation with said hub, and the central opening in said disk being for the most part cut back to leave relatively small contact areas in substantially the most effective positions for preventing rotation in either direction with respect to said hub.

6. A driving tumbler including: a non-circular hub and a replaceable driving disk having a correspondingly shaped opening, the majority of the surface of the wall forming said opening being recessed sufficiently to prevent contact thereof with said hub but other parts of the surface being so located that they can contact said hub in points substantially the most remote from the axis of rotation and in substantially the most effective positions to prevent relative rotation in either direction.

7. A hubless driving disk for a driving tumbler, said disk having driving lugs thereon and having a non-circular opening in its central portion, parts of the walls of said opening being recessed to leave relatively small contact areas in points substantially the most remote from the axis of rotation and located in substantially the most effective positions to prevent rotation in either direction of said disk relative to a correspondingly shaped hub on which it may be mounted.

JOHN F. MURTAUGH.